(12) United States Patent
Bruno et al.

(10) Patent No.: US 12,355,878 B2
(45) Date of Patent: Jul. 8, 2025

(54) SECRET MANAGEMENT IN DISTRIBUTED SYSTEMS THROUGH ONBOARDING

(71) Applicant: Dell Products L.P., Round Rock, TX (US)

(72) Inventors: Eric Joseph Bruno, Shirley, NY (US); Bradley K. Goodman, Nashua, NH (US); Joseph Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 223 days.

(21) Appl. No.: 18/459,100

(22) Filed: Aug. 31, 2023

(65) Prior Publication Data

US 2025/0080344 A1 Mar. 6, 2025

(51) Int. Cl.
*H04L 9/08* (2006.01)
*H04L 9/30* (2006.01)
*H04L 9/32* (2006.01)

(52) U.S. Cl.
CPC .......... *H04L 9/0894* (2013.01); *H04L 9/0891* (2013.01); *H04L 9/3073* (2013.01); *H04L 9/3265* (2013.01)

(58) Field of Classification Search
CPC ..................................... H04L 9/0894
See application file for complete search history.

(56) References Cited

U.S. PATENT DOCUMENTS

| | | | | |
|---|---|---|---|---|
| 6,044,155 | A * | 3/2000 | Thomlinson | H04L 63/12 380/281 |
| 6,272,632 | B1 * | 8/2001 | Carman | G06F 21/602 713/168 |
| 2017/0142082 | A1 * | 5/2017 | Qian | G06F 21/62 |
| 2023/0388115 | A1 * | 11/2023 | Carlisle | H04L 9/085 |

* cited by examiner

*Primary Examiner* — Bradley W Holder
(74) *Attorney, Agent, or Firm* — WOMBLE BOND DICKINSON (US) LLP

(57) ABSTRACT

Methods and systems for managing secrets are disclosed. To manage secrets, backups of the secrets may be obtained to facilitate future recoveries of the secrets. The backups may be established by a manufacturer of a device. When ownership in the device is transferred to a new owner, the backups of the secrets may be added to an ownership used to complete onboarding of the device to systems managed by the new owner. The new owner may use the backups, in conjunction with decryption keys, to access and use the secrets in the event of the secrets becoming inaccessible.

20 Claims, 7 Drawing Sheets

SECRET MANAGEMENT IN DISTRIBUTED SYSTEMS THROUGH ONBOARDING

FIELD

Embodiments disclosed herein relate generally to security. More particularly, embodiments disclosed herein relate to backing up secrets used by devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
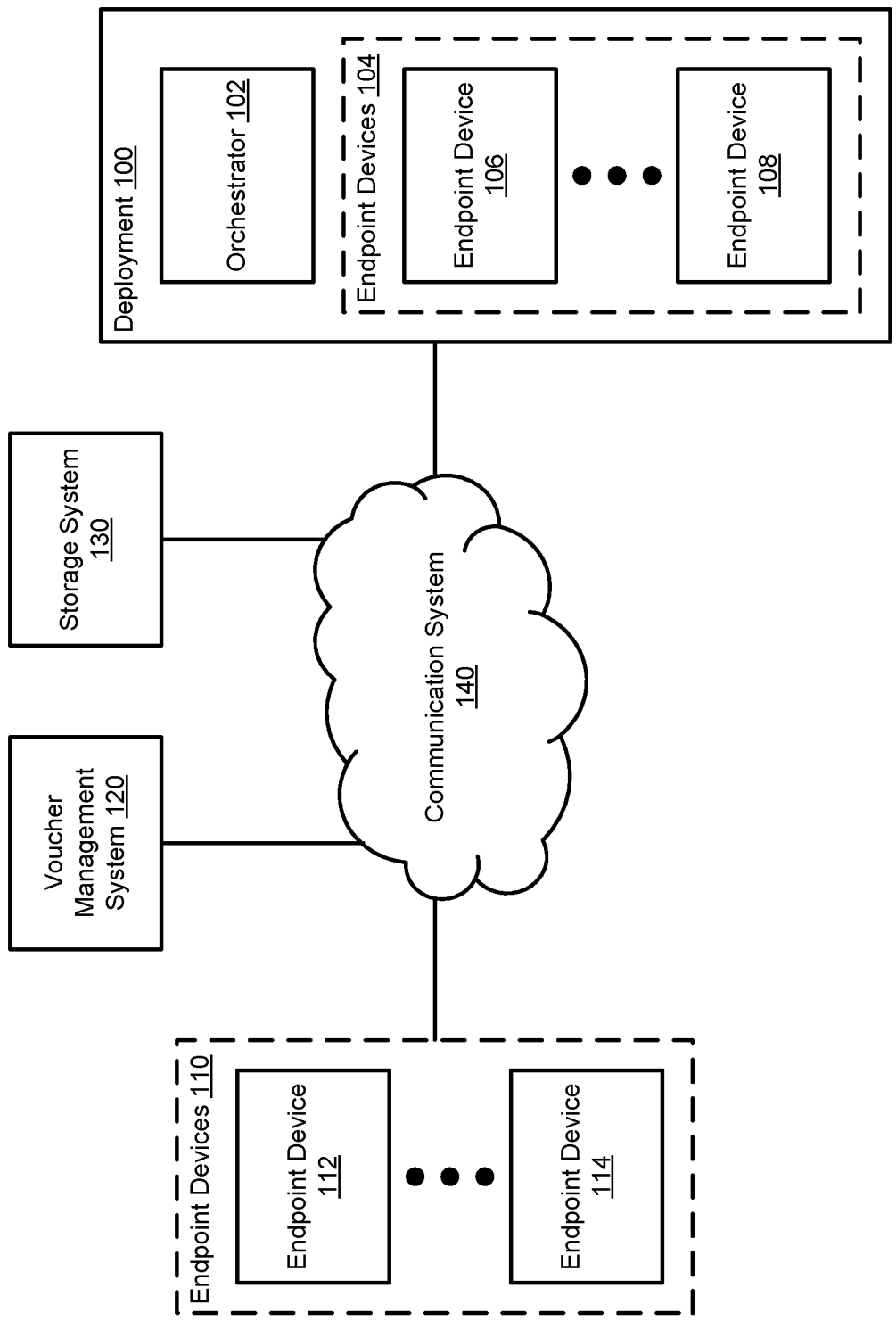
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for facilitating recovery of secrets. To facilitate recovery of secrets, backups of the secrets may be generated and escrowed (e.g., in a voucher management system, orchestrator, or other location) for future use.

During generation and while escrowed, a security model may be enforced. The security model may limit how decryption keys for the backups are retained. By doing so, undesired access to the secrets may be limited.

The backups of the secrets may be established, for example, when an endpoint device is manufactured. The backups may include encrypted copies of the secrets, and decryption keys for the encrypted copies may be stored for future use separately from the encrypted secrets. When ownership is transferred to another entity, the backup of the secret may be added to an ownership voucher used to onboard the endpoint device to a system managed by the new owner. The backup may be extracted from the ownership voucher and retained by an orchestrator for future use in recoveries of the secret. Additionally, the new owner may be given access to the decryption keys stored in the storage (e.g., via an access management system).

When access to the secret is lost, the backup may be used to restore access to the secret. To restore access, decryption keys for the encrypted backups of the secret may be used to gain access to the secret. Once obtained, the secret may be deployed to a device. Once deployed, the secret may be used to facilitate, for example, access to data previously secured using the secret.

By doing so, embodiments disclosed herein may facilitate secure backup of secrets. Consequently, future access to secrets may be improved even when hardware components that otherwise safeguard the secrets become inoperable.

In an embodiment, a method for managing a secret in a distributed system is provided. The method may include identifying, by an orchestrator tasked with managing an endpoint device, a recovery for the secret to the endpoint device; based on the identified recovery for the secret and by the orchestrator: obtaining a symmetric key retained in a storage system that: is separate from the orchestrator and, that comprises an access management system that restricts access to the symmetric key; obtaining a public key of a device keypair maintained by the endpoint device; decrypting an encrypted copy of the secret using the symmetric key to obtain the secret, the encrypted copy of the secret being obtained by the orchestrator from an ownership voucher used by the orchestrator to onboard a second endpoint device that maintained the secret; re-encrypting the secret using the public key to obtain a re-encrypted secret; and restoring the secret to the endpoint device using the re-encrypted secret.

The method may also include, prior to identifying the recovery: obtaining the ownership voucher comprising the encrypted secret; extracting the encrypted secret from the ownership voucher to obtain an updated ownership voucher; archiving the encrypted secret for future use; and onboarding the second endpoint device using the updated ownership voucher, the second endpoint device comprising a trusted platform module that hosts the secret.

Restoring the secret to the endpoint device may include providing a copy of the re-encrypted secret to the endpoint device to allow the endpoint device to decrypt the re-encrypted secret using a private key of the device keypair to obtain a decrypted re-encrypted secret, and add the decrypted re-encrypted secret to a trusted platform module of the endpoint device.

The storage may be maintained by a manufacturer of the endpoint device, and the access management system may provide access to the symmetric key to an owner of the endpoint device.

The symmetric key may be generated by the manufacturer, and the symmetric key may be added to the ownership voucher by the manufacturer.

The ownership voucher may include the encrypted secret, and a certificate chain that defines delegations of authority.

The delegations of authority may grant authority over the endpoint device to an entity that operates the orchestrator, and the certificate chain may be cryptographically verifiable from a root of trust for the endpoint device.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and the method may be performed when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include deployment 100. Deployment 100 may include orchestrator 102 and endpoint devices 104. Each endpoint device (e.g., 106, 108) may provide similar and/or different computer implemented services, and may provide the computer implemented services independently and/or in cooperation with other endpoint devices. Orchestrator 102 may manage the operation of endpoint device 104.

When providing the computer implemented services, endpoint devices 104 may utilize secrets. The secrets may include symmetric and/or asymmetric keys. The secrets may be used, for example, to encrypt data stored in storage of endpoint devices 104, to create cryptographically verifiable signatures (e.g., to authenticate the endpoint device and/or state of operation of the endpoint device to another device), and/or for other purposes.

To manage the secrets, endpoint devices 104 may each include a trusted platform module (TPM) or other types of hardware devices for managing secrets. The TPM may limit use of the secrets based on the security posture of a host endpoint device. By doing so, the impact of a compromised endpoint device may be reduced by limiting and/or preventing use of the secrets by the compromised device.

However, if a TPM becomes damaged such that the secrets that it protects become unusable by the host endpoint device, then the ability of the endpoint device to provide the computer implemented services may be impacted. For example, the TPM may protect volume management keys (VMKs), which may be used to encrypt stored data. If the VMKs become unusable, then encrypted stored data may not be decrypted thereby limited access to the stored data. Secrets protected by TPMs may be used for other purposes without departing from embodiments disclosed herein.

Regardless of which secrets are unable to be used, the computer implemented services by vided by endpoint devices 104 may be impacted (e.g., may be prevented from providing some or all desired computer implemented services which depend on use of the secrets).

If secrets maintained by a TPM becomes unusable (due to impairment of the TPM and/or host endpoint device), the TPM may be replaced with a different TPM or the host endpoint device for the TPM may be replaced with another endpoint device having a different TPM. However, the different TPMs may not have the secrets protected by the now unusable TPM. Consequently, the different TPM may not facilitate use of the secrets necessary for the computer implemented services to be provided.

In general, embodiments disclosed herein may provide methods, systems, and/or devices for managing secrets used by endpoint devices. To manage the secrets used by the endpoint devices, backups of the secrets may be made and used to restore future use of the secrets.

However, to backup the secrets, the secrets may be exported from a TPM. Once exported, the exported secrets may not be protected by the TPM. Consequently, if obtained by a malicious entity, the secrets may be used to compromise various aspects of operation of a distributed system.

To reduce the likelihood of the exported secrets being obtained by malicious entities, the secrets may be managed in accordance with a security model. The security model may govern how secrets are to be managed. For example, the security model may require that (i) secrets be encrypted while not protected by a TPM, and (ii) decryption keys usable to decrypt encrypted secrets not be stored with the encrypted secrets in a manner that allows the decryption keys to be used without verification that an entity wishing to use the decryption keys is authorized to use the decryption keys. By meeting these requirements of the security model, the secrets exported from a TPM may be less likely to be obtained by a malicious entity.

To meet the requirements of the secret model, embodiments disclosed herein may protect decryption keys usable to decrypt encrypted secrets using symmetric keys. The symmetric keys may be used to encrypt the secrets while not protected by a TPM.

When an endpoint device (e.g., 100) is manufactured, a symmetric key may be generated and used to encrypt a copy of a secret maintained by the TPM of an endpoint. The symmetric key may be stored in storage system 130, which may implement an access management system that limits access to the symmetric keys. For example, access to the symmetric keys may be limited to an owner of an endpoint device, and/or another entity designated by the owner.

When the endpoint device is purchased by an entity (e.g., an operator of deployment 100), the encrypted secret may be added to an ownership voucher. The ownership voucher may be provided to the owner, or a designated entity such as orchestrator 102. When obtained, the encrypted secret may be extracted and retained to perform recoveries of the secret should the TPM of the endpoint device that maintains the secret become inoperable. The remaining portion of the ownership voucher may be used to onboard the endpoint device to a system, such as deployment 100.

When a recovery of the secret is to be performed, the orchestrator 102 may obtain a copy of the symmetric key from storage system 130. The encrypted secret may be decrypted. To protect the secret during transport from orchestrator 102 to a target endpoint device (e.g., any of endpoint device 104), the secret may be re-encrypted using a public key of a keypair maintained by the target endpoint device. The target endpoint device may then decrypt the re-encrypted secret, and use the secret.

For example, the secret may be installed in a TPM of the target endpoint device, and may be used to decrypt data that was previously encrypted using the secret. The data may be from a backup of an endpoint device of endpoint devices 104 that has failed, suffered a TPM failure, etc.

By doing so, embodiments disclosed herein may manage secrets used by endpoint in a manner that reduces their likelihood of compromise while enabling the secrets to be recovered. Consequently, a distributed system in accordance with an embodiment may be more resilient to failures of devices and components thereof such as TPMs. For example, failures of such devices may be less likely to result in data loss by preserving access to volume management keys (VMKs) used to encrypt data even when the TPMs that protect the VMKs become inoperable.

To provide the above noted functionality, the system of FIG. 1 may include deployment 100, endpoint devices 110, voucher management system 120, storage system 130, and communication system 140. Each of these components is discussed below.

Endpoint devices 110 may provide computer implemented services using one or more secrets. Endpoint devices 110 may be manufactured by a manufacturer, may be sold to intermediate purchasers, and then may be sold to operators of deployments such as deployment 100.

Deployment 100 may provide computer implemented services. To do so, deployment 100 may include orchestrator 102 and any number of endpoint devices 104.

Orchestrator 102 may manage onboarding and operation of endpoint devices 104. To onboard an endpoint device, orchestrator 102 may (i) obtain an ownership voucher from voucher management system 120, (ii) extract an encrypted secret from the ownership voucher, (iii) archive the encrypted secret for future use, and (iv) use the ownership voucher to take authority over, configure, and/or otherwise prepare the endpoint device for use in deployment 100. For example, the ownership voucher may be used to establish authority of orchestrator 102 over a corresponding endpoint device (e.g., 110).

To manage operation of endpoint devices 104, orchestrator 102 may participate in recoveries of secrets. To participate in the recoveries of the secrets, orchestrator 102 may (i) obtain decryption keys for encrypted secrets, (ii) decrypt the encrypted secrets using the decryption keys, and (iii) restore the secrets to various endpoint devices (e.g., 106, 108) by securely installing the secrets in TPMs of the endpoint devices.

Endpoint devices 104 may be endpoint devices that have been onboarded and are managed by orchestrator 102, and may provide computer implemented services. To provide the computer implemented services, endpoint devices 104 may utilize secrets protected by TPMs. In the event of a failure of an endpoint device or hosted TPM, backups of the secrets maintained by orchestrator 102 may be used to restore the secret to a new TPM (e.g., replacement or part of a different endpoint device). To participate in recoveries, an endpoint device may generate a device keypair, provide the public key of the device keypair to orchestrator 102, decrypt an encrypted secret from orchestrator 102 using the private key of the device keypair, and install the now-decrypted secret in a hosted TPM. Consequently, the secret may be both protected and usable via the TPM.

Voucher management system 120 may generate and provide ownership vouchers (e.g., to orchestrator 102). The ownership vouchers may include encrypted secrets from endpoint devices being onboarded to various deployments, and/or other collections of data processing systems. The ownership vouchers may also include, for example, cryptographically verifiable certificate chains usable to verify delegations of authority over endpoint devices. The ownership vouchers may allow any of endpoint devices 110 identify whether other entities (e.g., orchestrator 102) have been delegated authority over them. For example, the certificates may include authority delegation statements that may establish chains of delegation of authority from the root of trust. The root of trust for each of endpoint devices 110 may be a public key of a public private keypair maintained by the manufacturer.

Storage system 130 may store symmetric keys for future use. The symmetric keys may be used to encrypt the secrets that may be included in the ownership vouchers, and may be used to decrypt the encrypted secrets. Additionally, storage system 130 may implement an access management system that may restrict access to the symmetric keys. For example, the access management system may only allow owners, or designees of the owners, of endpoint devices to access symmetric keys used to encrypt the secrets.

Storage system 130 may, for example, be part of a system operated by a manufacturer of endpoint devices 110, be part of a public cloud utilized by an operator of deployment 100, be part of a system operated by an operator of deployment 100, etc.

Figure 3A:
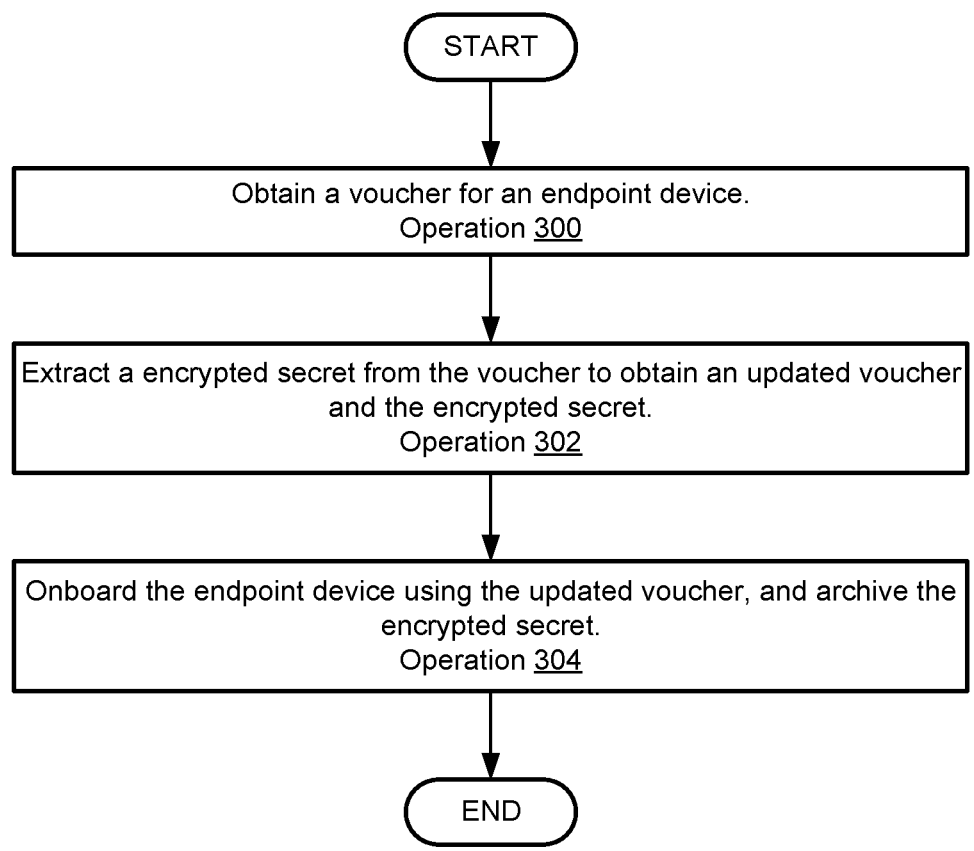
FIG. 3A-3B show flow diagrams illustrating methods in accordance with an embodiment.
Figure 3B:
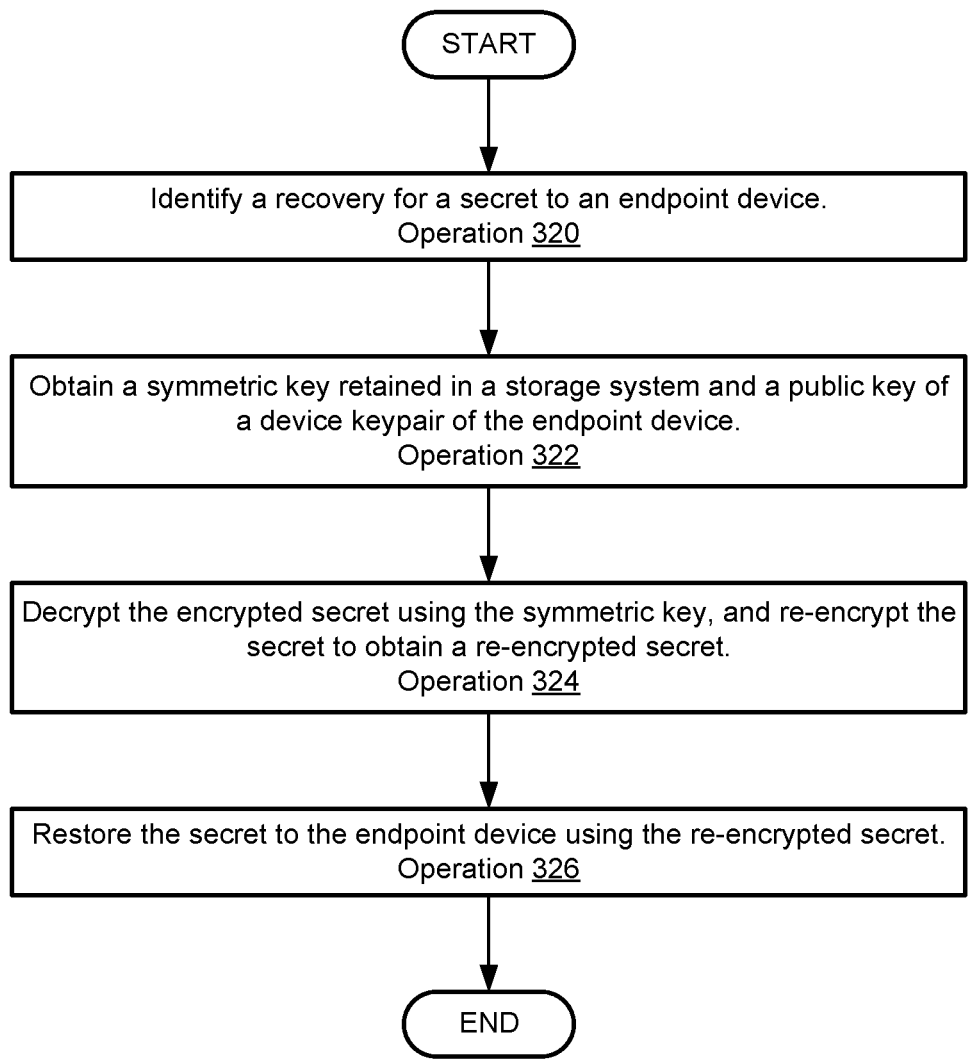

When providing their functionality, any of (and/or components thereof) endpoint devices 110, deployment 100, voucher management system 120, storage system 130, and/or other components may perform all, or a portion, of the methods illustrated in FIGS. 3A-3B.

Any of (and/or components thereof) deployment 100, endpoint devices 110, voucher management system 120, and storage 130 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 140. In an embodiment, communication system 140 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those components illustrated therein.

Figure 2A:
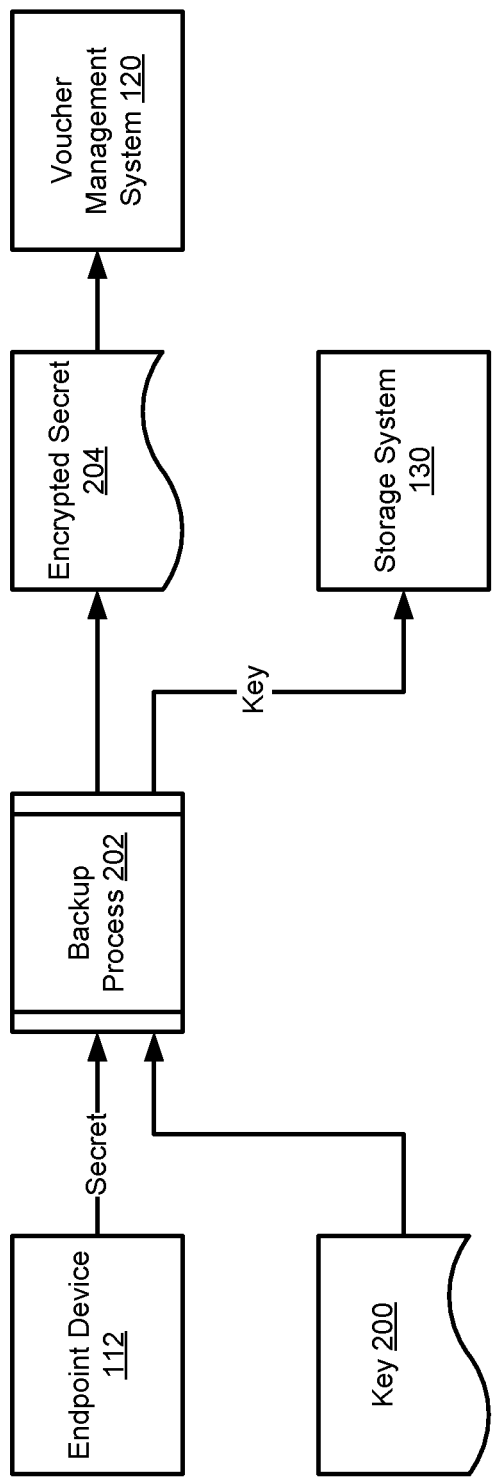
FIGS. 2A-2C show data flow diagrams in accordance with an embodiment.
Figure 2B:
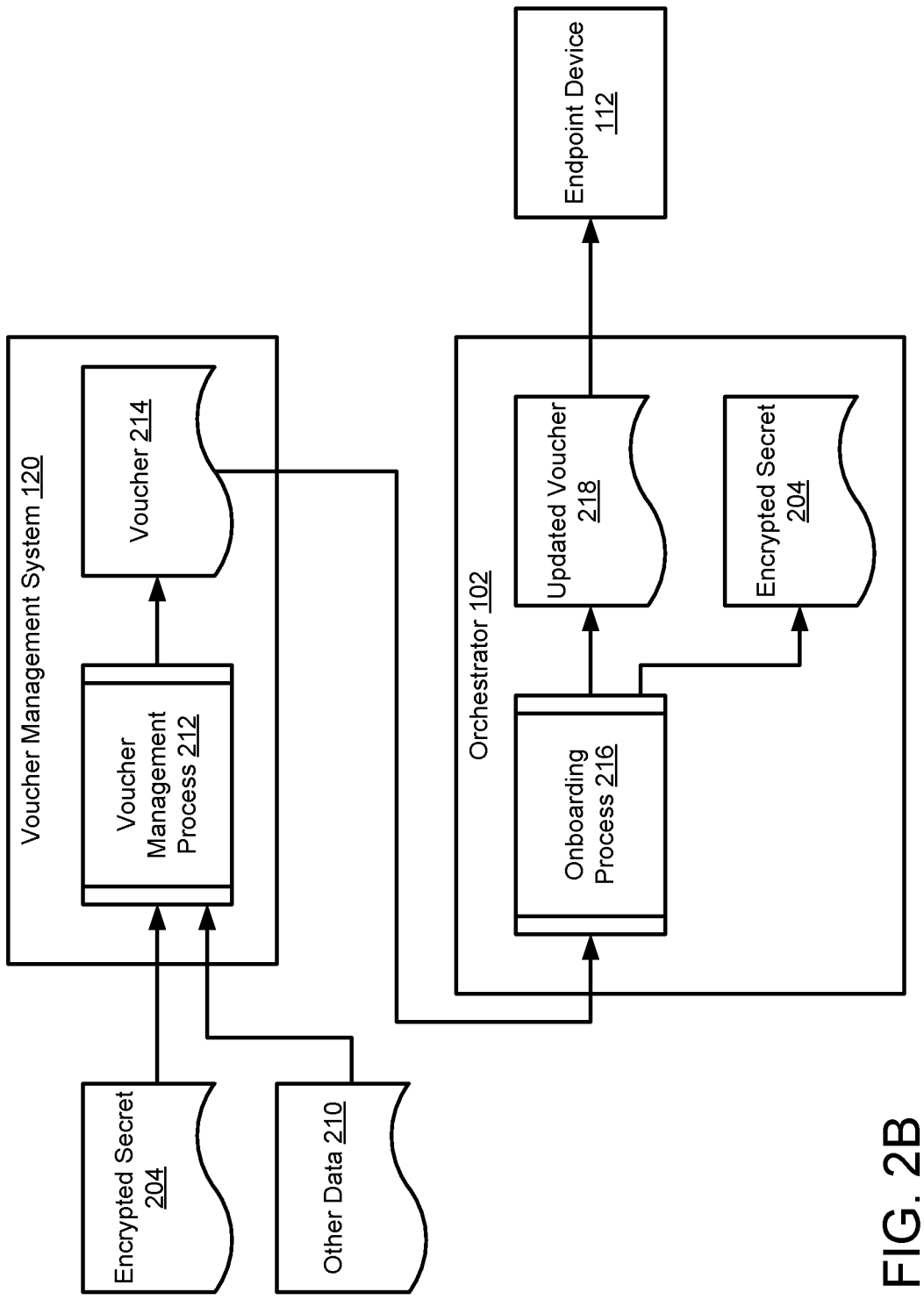
Figure 2C:
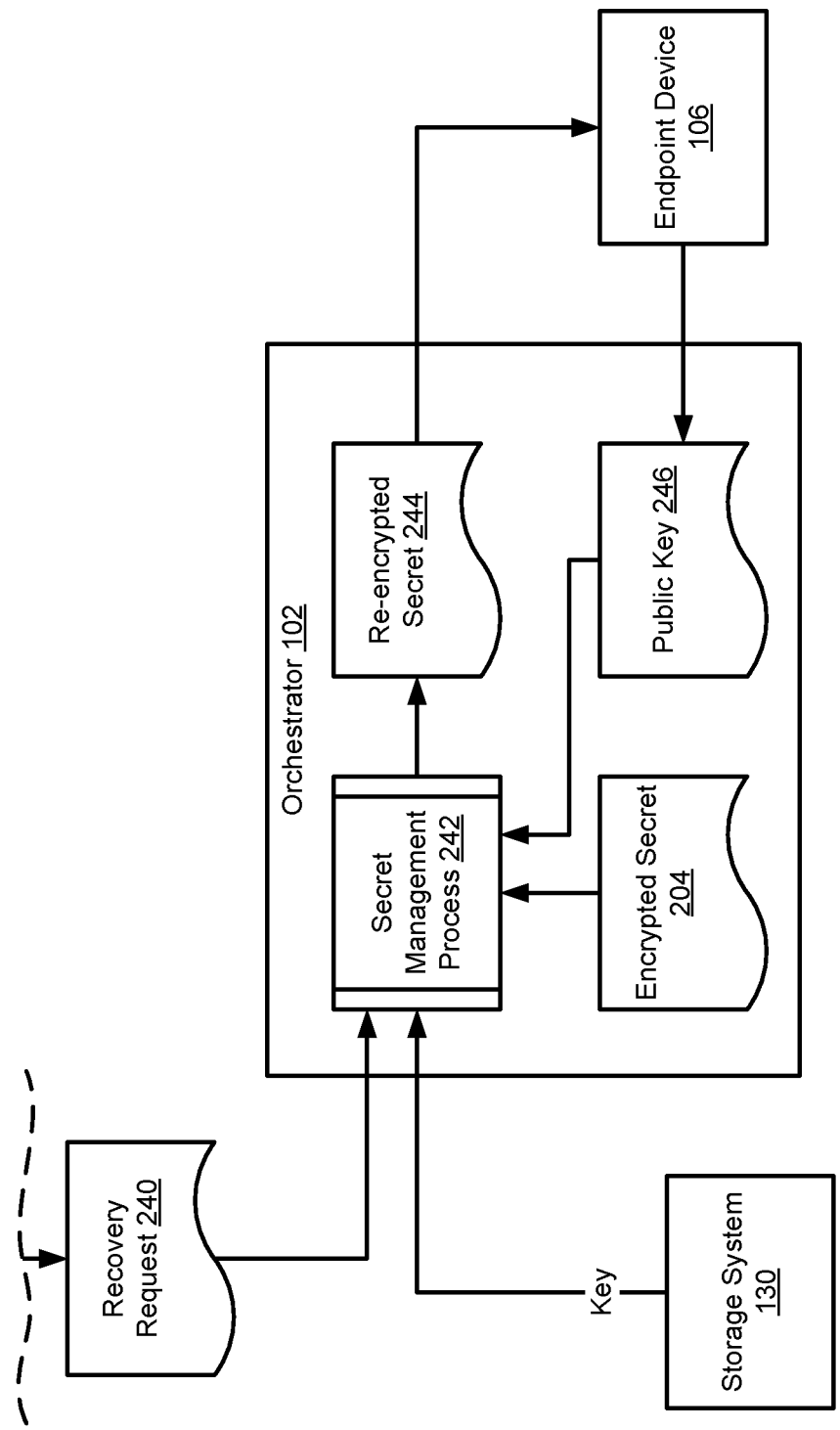

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 200, 204, etc.) is used to represent data structures, and a second set of shapes (e.g., 202, 212, etc.) is used to represent processes performed using and/or that generate data.

Turning to FIG. 2A, a first data flow diagram in accordance with an embodiment is shown. The first data flow diagram may illustrate data used in and data processing performed in backing up secrets from endpoint devices.

To backup a secret, consider a scenario where endpoint device 112 is manufactured by a manufacturer. To backup the secret, backup process 202 may be performed. During backup process 202, the secret may be encrypted using key 200. Key 200 may be a symmetric key usable to decrypt the secret once it is encrypted. Backup process 202 may be performed by a TPM hosed by endpoint device 112, and/or may be performed by other systems.

Once encrypted secret 204 is obtained, it may be stored with voucher management system 120 and/or with other devices. Key 200 may be archived with storage system 130, and the access management system of storage system 130 may be set to limit access to key 200 (e.g., to those that own endpoint device 112).

Turning to FIG. 2B, a second data flow diagram in accordance with an embodiment is shown. The second data flow diagram may illustrate data used in and data processing performed in onboarding of endpoint devices.

To onboard endpoint device 112, endpoint device 112 may be shipped to a customer location (e.g., deployment 100), and may begin to interact with orchestrator 102. To establish authority over endpoint device 112 and onboard it, orchestrator 102 may perform onboarding process 216. During onboarding process 216, orchestrator may obtain voucher 214 from voucher management system 120.

Voucher 214 may be obtained via voucher management process 212. During voucher management process 212, encrypted secret 204 and other data 210 (e.g., certificate chains that delegate authority to orchestrator 102 and/or a new owner of endpoint device 112) may be added to voucher 214. Once obtained, voucher 214 may be provided to orchestrator 102.

Returning to the discussion of onboarding process 216, encrypted secret 204 may be extracted from voucher 214, and archived with orchestrator 102. Updated voucher 214, free of encrypted secret 204, may be used to onboard endpoint device 112 to deployment 100. For example, updated voucher 218 may be used to establish authority over endpoint device 112 allowing orchestrator 102 to update the configuration of endpoint device 112, deploy software to endpoint device 112, etc.

Once onboarded, endpoint device 112 may provide various computer implemented services as part of deployment 100. When doing so, endpoint device 112 may utilize the unencrypted copy of the secret managed by its TPM.

However, access to the secret may be lost, for example, if the TPM or endpoint device 112 itself becomes inoperable, impaired, etc.

Turning to FIG. 2C, a third data flow diagram in accordance with an embodiment is shown. The third data flow diagram may illustrate data used in and data processing performed in recovering a secret.

Returning to the discussion of FIG. 2B, when a TPM becomes unusable, the secrets maintained by the TPM may become inaccessible. This may cause the host endpoint device to no longer be able to access data encrypted using secrets maintained by the TPM, to sign data structures using the secrets, etc. Consequently, the ability of the endpoint device to continue to participate in computer implemented services may be impaired.

To address this impairment, the TPM of the endpoint device may be replaced or a different endpoint device with a different TPM may replace the impaired device. However, these new TPMs may not include copies of the secrets previously maintained by the inoperable TPM.

To facilitate use of the secrets, a recovery of the secrets may be performed. For example, to initiate a recovery, a person with sufficient credentials may contact orchestrator 102 and initiate a secret recovery by providing recovery request 240. Recovery request 240 may be a signed workorder to restore a secret to a target endpoint device. The target endpoint device may be an existing endpoint device or a new endpoint device. For sake of discussion, presume that in this example endpoint device 106 may be the target endpoint device.

If endpoint device 106 is a new endpoint device from a manufacturer, the new endpoint device may need to be onboarded to be brought under control of orchestrator 102.

Once recovery request 240 is obtained, secret management process 242 may be performed. During secret management process 242, a decryption key usable to decrypt encrypted secret 204 may be obtained. The decryption key may be identified using information from recovery request 240 (e.g., may specify an identity of an endpoint device for which the back (e.g., encrypted secret 204) was generated). For example, an identifier of an endpoint device that hosts a now-inoperable TPM module may be provided to storage system 130. Storage system 130 may use the identifier to lookup a corresponding symmetric key (e.g., a decryption key) that was previously used to establish a backup of a secret from the endpoint device identified by the identifier.

To access storage system 130, a user or other entity may need to provide various information required by the access management system of storage system 130 to allow access to the symmetric secret. For example, orchestrator 102 may have access to a security token or other cryptographically verifiable data structure usable to authenticate itself to storage system 130. In another example, a user operating a user device (e.g., endpoint device) may operably connected to storage system 130, provide corresponding login credentials, download the symmetric key, and provide a copy of the symmetric key to orchestrator 102.

Once obtained, the symmetric key may be used to decrypt encrypted secret 204. To facilitate secure transmission of the now-decrypted secret to endpoint device 106, a public key (e.g., 246) of a device keypair maintained by endpoint device 106 may be used to re-encrypt the secret. Once re-encrypted, re-encrypted secret 244 may be transmitted to endpoint device 106.

Upon receipt, endpoint device 106 may decrypt the re-encrypted secret using the private key of the device keypair. Once decrypted, the secret may be used to perform various cryptographic operations.

For example, if endpoint device 106 had its TPM replaced, then the secret may be installed in the replacement TPM and may be used to decrypt encrypted data (previously encrypted using the copy of the secret stored in the original TPM). The decrypted data may be used to provide computer implemented services.

In another example, if endpoint device 106 is a replacement endpoint device, then the secret may be installed in the TPM of the replacement endpoint device. Once installed, the TPM may be used to decrypt encrypted data (previously encrypted using the copy of the secret stored in the original TPM) such as a backup of the data of the original endpoint device.

While described with respect to decryption, the secret in the TPM may be used to perform other types of cryptographic operations.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, using the flow shown in FIGS. 2A-2C, embodiments disclosed herein may facilitate recovery of secret used by endpoint devices to provide various services.

As discussed above, the components of FIG. 1 may perform various methods to manage the operation of and/or interactions between endpoint devices. FIGS. 3A-3B illustrate methods that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method for backing up a secret in accordance with an embodiment is shown. The method may be performed by any of deployment 100, endpoint devices 110, voucher management system 120, storage system 130, and/or other components of the system shown in FIG. 1.

Prior to operation 300, an endpoint device may be shipped to a deployment for onboard, may be purchased from a supplier, and/or may otherwise be in preparation to join the deployment.

At operation 300, a voucher for the endpoint device may be obtained. The voucher may be obtained by requesting it from a voucher management system. The voucher management system may provide the voucher in response to the request.

The voucher may include information for onboarding an endpoint device such as certificate chains that are cryptographically verifiable using a root of trust (e.g., a public key) maintained by the endpoint device. The certificate chains may document delegations of authority to an orchestrator.

The voucher may also include an encrypted secret of the endpoint device.

At operation 302, the encrypted secret may be extracted from the voucher to obtain an updated voucher and the encrypted secret. The encrypted secret may be extracted by (i) identifying it within the voucher, (ii) making a copy of it, and (iii) deleting the encrypted secret from the voucher.

At operation 304, the endpoint device is onboarded using the updated voucher. The endpoint device may be onboarded by establishing authority over the endpoint device using the updated voucher, and using the authority to configure the endpoint device. For example, the orchestrator may sign work orders that may be trusted by the endpoint device by virtue of the chain of certificates in the voucher.

For example, the certificates may document chains of authority delegation and ownership transfer of the endpoint device. Each chain may be signed using a private key of an entity that had authority/ownership over the endpoint device (as documented by the certificate chain) at the time the certificate was created. Each certificate delegating authority/ownership may include a public key of the new owner of the endpoint device. Thus, the chain of certificates may be cryptographically verifiable all the way back to the root of trust of the endpoint device. Consequently, the endpoint device may trust and be able to verify work orders from the orchestrator as having sufficient authority over the endpoint device to invoke functions of the endpoint device as specified in the work order.

Additionally, the encrypted secret may be archived for future use in recoveries for the secret.

The method may end following operation 304.

Turning to FIG. 3B, a second flow diagram illustrating a method for restoring a secret in accordance with an embodiment is shown. The method may be performed by any of deployment 100, endpoint devices 110, voucher management system 120, storage system 130, and/or other components of the system shown in FIG. 1.

At operation 320, a recovery for a secret to an endpoint device is identified. The recovery may be identified by receiving a request from an entity that has sufficient authority to invoke the recovery for the secret. The request may specify the secret, and may include an identity of a new endpoint device to which the secret is to be recovered. The secret may have been previously used by an endpoint device that has suffered a TPM failure, or has otherwise failed itself.

At operation 322, a symmetric key retained in a storage system is obtained. Additionally, a public key of a device keypair of the endpoint device to which the secret is to be restored may be obtained.

The symmetric key may be obtained by (i) requesting and receiving it from the storage system, (ii) obtaining it from another device, such as a user device used by a user that retrieves it from the storage system, and/or via other methods.

The public key of the device keypair may be obtained by (i) receiving the public key from the endpoint device to which the secret is to be restored, (ii) by generating the device keypair (e.g., the private key may be provided to the endpoint device), and/or via other methods.

At operation 324, an encrypted secret (e.g., previously archived by an orchestrator) is decrypted using the symmetric key, and then re-encrypted using the public key of the device keypair to obtain a re-encrypted secret.

At operation 326, the secret is restored to the endpoint device using the re-encrypted secret. The secret may be restored by sending the re-encrypted secret to the endpoint device. Doing so may cause the endpoint device to decrypt the re-encrypted secret using the private key of the device keypair, and to use the now-decrypted secret for various purposes. For example, the secret may be installed in a TPM of the endpoint device for management, and may be used to decrypt encrypted data, encrypt data, sign data structure, and/or perform other types of cryptographic operations. The performance of the cryptographic operations may allow the endpoint device to provide desired computer implemented services.

Thus, using the methods shown in FIGS. 3A-3B, embodiments disclosed herein may facilitate restoration of secrets thereby enabling computer implemented services to be provided.

Figure 4:
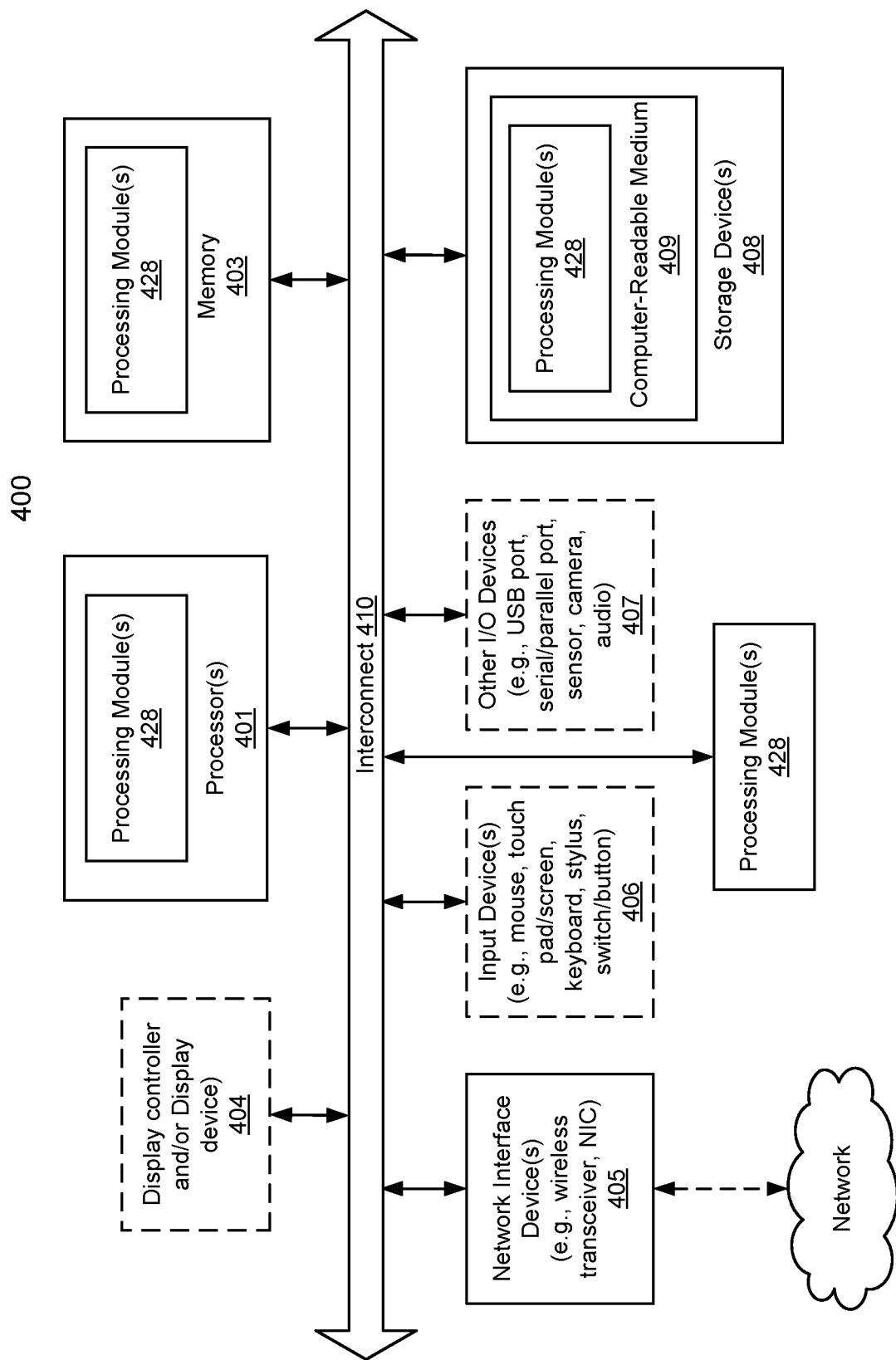
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may be implemented primarily using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a secret in a distributed system, the method comprising:
 identifying, by an orchestrator tasked with managing an endpoint device, a recovery for the secret to the endpoint device;
 based on the identified recovery for the secret and by the orchestrator:
  obtaining a symmetric key retained in a storage system that:
   is separate from the orchestrator and, that
   comprises an access management system that restricts access to the symmetric key;

obtaining a public key of a device keypair maintained by the endpoint device;
decrypting an encrypted copy of the secret using the symmetric key to obtain the secret, the encrypted copy of the secret being obtained by the orchestrator from an ownership voucher used by the orchestrator to onboard a second endpoint device that maintained the secret;
re-encrypting the secret using the public key to obtain a re-encrypted secret; and
restoring the secret to the endpoint device using the re-encrypted secret.

2. The method of claim 1, further comprising:
prior to identifying the recovery:
obtaining the ownership voucher comprising the encrypted secret;
extracting the encrypted secret from the ownership voucher to obtain an updated ownership voucher;
archiving the encrypted secret for future use; and
onboarding the second endpoint device using the updated ownership voucher, the second endpoint device comprising a trusted platform module that hosts the secret.

3. The method of claim 1, wherein restoring the secret to the endpoint device comprises:
providing a copy of the re-encrypted secret to the endpoint device to allow the endpoint device to decrypt the re-encrypted secret using a private key of the device keypair to obtain a decrypted re-encrypted secret, and add the decrypted re-encrypted secret to a trusted platform module of the endpoint device.

4. The method of claim 1, wherein the storage is maintained by a manufacturer of the endpoint device, and the access management system provides access to the symmetric key to an owner of the endpoint device.

5. The method of claim 4, wherein the symmetric key is generated by the manufacturer, and the symmetric key is added to the ownership voucher by the manufacturer.

6. The method of claim 1, wherein ownership voucher comprises the encrypted secret, and a certificate chain that defines delegations of authority.

7. The method of claim 6, wherein the delegations of authority grant authority over the endpoint device to an entity that operates the orchestrator, and the certificate chain is cryptographically verifiable from a root of trust for the endpoint device.

8. A non-transitory machine-readable medium having instructions stored therein, which when executed by at least one processor, cause a system to perform system first operations for managing a secret in a distributed system, the first operations comprising:
identifying, by an orchestrator tasked with managing an endpoint device, a recovery for the secret to the endpoint device;
based on the identified recovery for the secret and by the orchestrator:
obtaining a symmetric key retained in a storage system that:
is separate from the orchestrator and, that comprises an access management system that restricts access to the symmetric key;
obtaining a public key of a device keypair maintained by the endpoint device;
decrypting an encrypted copy of the secret using the symmetric key to obtain the secret, the encrypted copy of the secret being obtained by the orchestrator from an ownership voucher used by the orchestrator to onboard a second endpoint device that maintained the secret;
re-encrypting the secret using the public key to obtain a re-encrypted secret; and
restoring the secret to the endpoint device using the re-encrypted secret.

9. The non-transitory machine-readable medium of claim 8, wherein the operations further comprise:
prior to identifying the recovery:
obtaining the ownership voucher comprising the encrypted secret;
extracting the encrypted secret from the ownership voucher to obtain an updated ownership voucher;
archiving the encrypted secret for future use; and
onboarding the second endpoint device using the updated ownership voucher, the second endpoint device comprising a trusted platform module that hosts the secret.

10. The non-transitory machine-readable medium of claim 8, wherein restoring the secret to the endpoint device comprises:
providing a copy of the re-encrypted secret to the endpoint device to allow the endpoint device to decrypt the re-encrypted secret using a private key of the device keypair to obtain a decrypted re-encrypted secret, and add the decrypted re-encrypted secret to a trusted platform module of the endpoint device.

11. The non-transitory machine-readable medium of claim 8, wherein the storage is maintained by a manufacturer of the endpoint device, and the access management system provides access to the symmetric key to an owner of the endpoint device.

12. The non-transitory machine-readable medium of claim 11, wherein the symmetric key is generated by the manufacturer, and the symmetric key is added to the ownership voucher by the manufacturer.

13. The non-transitory machine-readable medium of claim 8, wherein ownership voucher comprises the encrypted secret, and a certificate chain that defines delegations of authority.

14. The non-transitory machine-readable medium of claim 13, wherein the delegations of authority grant authority over the endpoint device to an entity that operates the orchestrator, and the certificate chain is cryptographically verifiable from a root of trust for the endpoint device.

15. An orchestrator, comprising:
a processor; and
a memory coupled to the processor to store instructions, which when executed by the processor, cause the orchestrator to perform operations for managing a secret in a distributed system, the operations comprising:
identifying a recovery for the secret to an endpoint device, the orchestrator managing the endpoint device;
based on the identified recovery for the secret:
obtaining a symmetric key retained in a storage system that:
is separate from the orchestrator and, that comprises an access management system that restricts access to the symmetric key;
obtaining a public key of a device keypair maintained by the endpoint device;
decrypting an encrypted copy of the secret using the symmetric key to obtain the secret, the encrypted copy of the secret being obtained by the orchestrator from an ownership voucher used by the orchestrator to onboard a second endpoint device that maintained the secret;

re-encrypting the secret using the public key to obtain a re-encrypted secret; and restoring the secret to the endpoint device using the re-encrypted secret.

16. The orchestrator of claim 15, wherein the operations further comprise:

prior to identifying the recovery:

obtaining the ownership voucher comprising the encrypted secret;

extracting the encrypted secret from the ownership voucher to obtain an updated ownership voucher;

archiving the encrypted secret for future use; and onboarding the second endpoint device using the updated ownership voucher, the second endpoint device comprising a trusted platform module that hosts the secret.

17. The orchestrator of claim 15, wherein restoring the secret to the endpoint device comprises:

providing a copy of the re-encrypted secret to the endpoint device to allow the endpoint device to decrypt the re-encrypted secret using a private key of the device keypair to obtain a decrypted re-encrypted secret, and add the decrypted re-encrypted secret to a trusted platform module of the endpoint device.

18. The orchestrator of claim 15, wherein the storage is maintained by a manufacturer of the endpoint device, and the access management system provides access to the symmetric key to an owner of the endpoint device.

19. The orchestrator of claim 18, wherein the symmetric key is generated by the manufacturer, and the symmetric key is added to the ownership voucher by the manufacturer.

20. The orchestrator of claim 15, wherein ownership voucher comprises the encrypted secret, and a certificate chain that defines delegations of authority.

* * * * *